United States Patent
Dumitru et al.

(10) Patent No.: US 10,248,359 B2
(45) Date of Patent: Apr. 2, 2019

(54) SYSTEM, METHOD AND APPARATUS FOR ACCELERATING FAST BLOCK DEVICES

(76) Inventors: Douglas Dumitru, Laguna Hills, CA (US); Samuel J. Anderson, Wallingford, PA (US)

( * ) Notice: Subject to any disclaimer, the term of this patent is extended or adjusted under 35 U.S.C. 154(b) by 1621 days.

(21) Appl. No.: 12/104,979

(22) Filed: Apr. 17, 2008

(65) Prior Publication Data

US 2008/0228992 A1  Sep. 18, 2008

Related U.S. Application Data

(63) Continuation-in-part of application No. 12/041,509, filed on Mar. 3, 2008, now Pat. No. 8,380,944.

(60) Provisional application No. 60/909,903, filed on Apr. 3, 2007, provisional application No. 60/892,517, filed on Mar. 1, 2007.

(51) Int. Cl.
*G06F 12/02* (2006.01)
*G06F 3/06* (2006.01)

(52) U.S. Cl.
CPC .......... *G06F 3/0664* (2013.01); *G06F 3/068* (2013.01); *G06F 3/0613* (2013.01); *G06F 3/0679* (2013.01); *G06F 12/0246* (2013.01); *G06F 2212/1016* (2013.01); *G06F 2212/401* (2013.01); *G06F 2212/7202* (2013.01); *G06F 2212/7211* (2013.01)

(58) Field of Classification Search
CPC .............. G06F 12/00–12/16; G06F 2212/7207
USPC ................ 711/103, 156, 159, 206
See application file for complete search history.

(56) References Cited

U.S. PATENT DOCUMENTS

| | | | | |
|---|---|---|---|---|
| 5,845,021 | A * | 12/1998 | Kikuchi et al. | 382/232 |
| 6,670,897 | B1 * | 12/2003 | Lin | 341/65 |
| 6,675,281 | B1 | 1/2004 | Oh et al. | 711/207 |
| 7,299,384 | B1 * | 11/2007 | Rodriguez-Rivera et al. | 714/52 |
| 7,457,822 | B1 * | 11/2008 | Barrall et al. | |
| 2003/0163594 | A1 | 8/2003 | Aasheim et al. | 709/310 |
| 2003/0165076 | A1 * | 9/2003 | Gorobets et al. | 365/200 |
| 2004/0002999 | A1 * | 1/2004 | Rand | 707/104.1 |
| 2006/0184722 | A1 * | 8/2006 | Sinclair | G06F 3/0607 711/103 |

(Continued)

OTHER PUBLICATIONS

Chung, Tae-Sun et al., "System Software for Flash Memory: A Survey," Lecture Notes in Computer Science, 2006, No. 4096, pp. 394-404.

(Continued)

*Primary Examiner* — Nicholas J Simonetti
(74) *Attorney, Agent, or Firm* — Raymond Van Dyke; Van Dyke Law

(57) ABSTRACT

A system, method and apparatus directed to fast data storage on a block storage device. New data is written to an empty write block. If the new data is compressible, a compressed version of the new is written into the meta data. A location of the new data is tracked. Meta data associated with the new data is written. A lookup table may be updated based in part on the meta data. The new data may be read based the lookup table configured to map a logical address to a physical address. Disk operations may use state data associated with the meta data to determine the empty write block. A write speed-limit may also be determined based on a lifetime period, a number of life cycles and a device-erase-sector-count for the device. A write speed for the device may be slowed based on the determined write speed-limit.

20 Claims, 12 Drawing Sheets

(56) References Cited

U.S. PATENT DOCUMENTS

| | | | |
|---|---|---|---|
| 2007/0005928 A1 | 1/2007 | Trika et al. | 711/202 |
| 2007/0033374 A1* | 2/2007 | Sinclair et al. | 711/203 |
| 2007/0083697 A1 | 4/2007 | Birrell et al. | 711/103 |
| 2007/0094445 A1* | 4/2007 | Trika et al. | 711/113 |
| 2007/0101096 A1* | 5/2007 | Gorobets | 711/203 |

OTHER PUBLICATIONS

Kim, Gye-Jeong et al., "LGeDBMS: a Small DBMS for Embedded System with Flash Memory," 2006, VLDB Endowment, ACM 1-59593-385-9/06/09.

Lim, Seung-Ho et al., "Journal Remap-Based FTL for Journaling File System with Flash Memory," pp. 192-203, 2007.

Kawaguchi, Atsuo et al., "A Flash-Memory Based File System," *Advanced Research Laboraborty, Hitachi, Ltd.*, Usenix Technical Conference (1995).

International Search Report for PCT/US2008/055696 filed Mar. 3, 2008, dated Jun. 26, 2008.

\* cited by examiner

Read Device Header Record:

| | |
|---|---|
| 802 | Initialize Tables to Empty |
| 804 | Loop Through Each Write Block |
| 806 | Loop Within a Write Block until the end of the Write Block |
| 808 | Read Meta Header at beginning of address array |
| 810 | If ( Header Invalid ) skip to next Write Block (go 836) |
| 812 | Calculate size and location of rest of Address Array and Meta Footer ($2^{nd}$ half) |
| 814 | Read rest of Address Array and Meta Footer |
| 816 | If ( Meta Footer does not match Meta Header) skip to next write block (go 836) |
| 818 | Loop through each address in Meta Array |
| 820 | Lookup Address in LBA table (See Figure 5) |
| 822 | If ( Address Exists ) then |
| 824 | If ( Existing Address is newer ) then skip to next Address (go 832) |
| 826 | Remove existing address |
| 827 | Decrement fill counters for existing write block. |
| 828 | End If |
| 830 (831) | Update LBA with new address and increment fill counters for this block. |
| 832 | Repeat loop 820 for all address in address array |
| 834 | Repeat loop 818 until end of write block reached. |
| 836 | Repeat loop 804 for all write blocks. |

FIG. 8B

Write
1002  If ( no space in current Write block ) gosub WritePush

1004  Test if block cleared

1006  Add block address to write array 1008  if ( block not cleared ) copy block data to write buffer

Write Push
1010  Build write buffer that comprises at least:

* Write Header (e.g., portion of meta-information)
* Write Data Blocks
* Write Footer (e.g., another portion of meta-information)

1018  Write data to device

1020  Update current write position

1022  If ( Write Position at end of write block ) gosub GetWriteBlock

GetWriteBlock
1024  Find 100% empty block

1026  Find 2nd 100% empty block 1028  if ( no 2nd block available ) gosub Defrag 1030  Setup write pointer to head of empty block

Defrag
1032  Find block with least number of active data blocks

1034  Read Meta information from Disk

1036  Scrub Meta information removing stale and duplicate entries

1038  Loop through remaining data blocks

1040      Write data blocks with standard write routine 1042  continue until end of data block list 1044  Mark this block (with least number of active data blocks) as empty.

FIG. 10

SYSTEM, METHOD AND APPARATUS FOR ACCELERATING FAST BLOCK DEVICES

RELATED APPLICATIONS

The present application is a continuation-in-part application of U.S. patent application Ser. No. 12/041,509, filed Mar. 3, 2008, now U.S Pat. No. 8,380,944 entitled "Fast Block Device and Methodology," which in turn claims the benefit of U.S. Provisional Patent Application No. 60/909,903, filed Apr. 3, 2007 and U.S. Provisional Patent Application No. 60/892,517 filed Mar. 1, 2007, the disclosures of which are incorporated herein by reference.

FIELD OF THE INVENTION

The application relates generally to optimizing access to block storage devices by replacing slow random writes with highly efficient linear writes, methods for attaining the linear writes in different types of block storage devices, as well as methods for using pseudo data, compression, and a write speed-limit for further optimization, and block storage hardware devices derived from applying these methodologies to constructs of computer hardware.

BACKGROUND OF THE INVENTION

Block devices are computer components, such as disk drives and other mass storage devices, such as flash-memory and RAM-based disks. Traditionally, for a block storage device, the application that is using the storage accesses the device using a "block number". The device driver then translates this block number into a physical address on the device. This translation process usually involves linearly mapping the block number into the corresponding location on the block storage device. This occurs because Block Devices derive from an older idea: magnetic tape, and ultimately reaching back to voice recording on a wax cylinder, such as early devices made by Thomas Edison. These analog devices were strictly linear, and block devices have historically preserved this idea of linearity, but have also flattened it out into individual tracks or groups of known blocks. Thus, the segmented linear technique ultimately has the effect of playing drop-the-needle, such as on an analog phonographic disk or record, but in a digital manner, providing the capability of something between near and actual random-access, depending upon the specific construction of the block device.

The use of this pseudo-linearity, whether in devices, such as hard disks with their tracks, or flash-memory disks with their concept of erase blocks to establish neutral charge, produces linear reads and writes of frames that are very fast, but in many devices produces random writes that are habitually slow, as well as slow random reads in some devices.

While linearity has been the ideal, it has never been absolute due to imperfections in media. For instance, today's disk drives have algorithms for mapping around bad blocks. Here, one has a separate redundant area set aside to accept contents of specific blocks known to be bad.

Similarly, the mapping process is not consistently linear at the application level. In some applications, a "mapping layer" is introduced. This mapping layer can exist for a number of reasons. For example, logical volume managers can map logical blocks into physical blocks to facilitate storage device management allowing dynamic re-allocation of space. Managers using Redundant Arrays of Inexpensive Disks ("RAID") technology can map data into redundant patterns allowing continuous operation even in the case of storage device failures. In all of these mapping layer implementations, the mapping is designed to be simple, and as much as possible linear. While RAID devices can intermix blocks across multiple storage devices, the overall mapping is still linear from low to high block number. This linear mapping is a basic paradigm of storage device management.

Another aspect of conventional device mapping solutions is that they are generally static in operation. While some mappings allow for dynamic updating, such as when a disk error is detected and a "bad block" is "grown", most mappings remain the same for the life of the device. Device re-mapping based on live updates is not a part of any existing block device implementation.

The genesis of the invention at hand results from an inherent problem and weakness in most Block devices: that random writes to these devices are very slow, and that random reads are sometimes very slow as well. For instance, a high-speed disk drive can read and write about 170 4-kilobyte blocks per second in a truly random fashion, but can linearly read or write at a speed approaching 10,000 4-kilobyte blocks per second. Similarly, a device built out of NAND flash memory can linearly read and write at well over 5,000 4-kilobyte blocks per second, and also randomly read at this high speed, but can randomly write 50 to 70 such blocks in a second.

While random-access slowness is not an issue for anything stored in a large format, such as a word processing document, or a picture of some sort, it is a problem if one is randomly accessing many small files or records. This commonly occurs in a database environment, and also occurs in environments, such as Internet Message Access Protocol (IMAP) email service where individual small files, such as individual email messages, are stored in a set of directories.

In the particular case in point, there is a desire to use a NAND flash memory device for the purposes of random access in a database environment. However, while such devices were superb in their read performance of random records, being a good thirty times faster than high speed disk drives, their random write performance was less than half the performance of high speed disks. Also, the limited write life of NAND flash memory, as will be discussed later, created concerns about product durability.

However, there may be other ways that data might be organized if it were convenient and useful. Journaling is a method of recording changes to directories and the sizes and position of files without recording the changed contents of a particular file. In Journaling, these characteristics changes are recorded in the sequential order in which they occur. Transaction logging is similar to journaling except that it is implemented at the application level, and records the actual data contents of the files or records in question as these are recorded. As with Journaling, in the event of system failure, Transaction Logs can be played forward from a known good time and data set, such as a completed file backup, in order to bring the data set right up to the instant before failure actually occurred.

As understood by those skilled in the art, Journaling and especially Transaction Logging are very space-intensive. Both were originally implemented in a non-block device specifically using magnetic tape or other low-cost linear media to record the transactions as they occurred. Over time, both have switched to the use of low-cost block devices, such as disk drives, as these are now cheaper than magnetic tape, and can be viewed, in their native linear order of blocks, as the logical equivalent of a very long tape.

Journaling, and especially Transaction Logging, are being mentioned here as one alternative system of viewing data in a manner that is both new and linear, in that the new copy of the data supersedes the old one if the media is played forward through time, and as an example of the advantages of writing data in an alternative order rather than an order fixed to a specific location. However, it needs to be remembered that both Journaling and Transaction Logging are only operable in a linear fashion from first to last because there exists no mechanism of independently remembering where the current version of every datum is located.

SUMMARY OF THE PRESENT INVENTION

The present invention relates to a method, device, and system for fast data storage on a block storage device. The method includes, writing new data to an empty write block; tracking a location of the new data; and writing meta data associated with the new data. In one embodiment, the method further includes mounting the device, including reading each write block of the device and meta data associated with the each write block. The method may also include unmounting the device, including writing to each write block of the device and writing meta data associated with the each write block. The method may include updating a lookup table based in part on the meta data; and reading the new data based on the lookup table configured to map a logical address to a physical address. Moreover, the method may also include optimizing the device, including writing to a write block having the fewest active blocks and writing meta data associated with each write block, wherein existing live blocks are packed to a front of the write block and rewritten to the device.

In one embodiment, a block storage device is directed to optimizing data access and update patterns. The device may include a mapping layer configured to dynamically remap data; and a plurality of data blocks, each data block storing map information, wherein each cluster of data blocks stores meta information, including an age of the data blocks of the cluster, a count of the data blocks of the cluster, and an array of logical block numbers for the data blocks of the cluster. In one embodiment, the device may further include a fast lookup table configured to enable looking up a logical block, a reverse lookup table configured to enable looking up a physical location, and/or a table configured to enable looking up a write block, wherein the table includes a number of valid blocks in each write block, and an age of data in the write block. Moreover, a system is directed to employing the method and the device. In one embodiment, the system may comprise a primary computer system in communication with the block storage device, wherein the primary computer system is configured to provide the empty write block.

In an alternate embodiment, the method includes writing at least one portion of meta-information associated with a plurality of write blocks; getting an empty write block for writing the new data, if a current write position is at an end of the plurality of write blocks; writing new data in one of the empty write block or one of the plurality of write blocks; and updating a lookup table based on an address where the new data is written to. The method may also include defragging the block storage device if a first empty block and a second empty block is unavailable for writing the new data.

In one embodiment, the device may include a segment of known data in logical and linear order; a further segment of free space for the acceptance of updates; and a logical area for storing update reference changes. The device may further include a CPU configured to perform actions. The actions may comprise determining if space is unavailable for a current write block. If so, the actions may further comprise getting an empty write block; writing meta information and new data associated with a logical address to the empty write block; and updating a lookup table based on an address of the empty write block. The actions may further include reading the new data based on the lookup table. In one embodiment, the actions may further include defragging the device if the empty write block is unavailable.

Moreover, a system is directed to employing the method and the device. In one embodiment, the block storage device may be a storage appliance, a NAND-flash drive, or a hybrid RAM/Disk drive storage device. In one embodiment, the lookup table may be a reverse lookup table configured to enable looking up a physical location.

In another embodiment, a method is directed to fast data storage on a block storage device. The method may comprise determining if a write block is empty based on state data about the write block, wherein the state data is associated with an entry in a lookup table for the write block; writing new data to the empty write block; tracking a location of the new data; and writing meta data associated with the new data. The method may also comprise mounting the device, including reading each write block of the device and meta data associated with the each write block, wherein reading further comprises determining if the each write block is empty based on the state data associated with the write block.

Moreover, the method may comprise updating a lookup table based in part on the meta data; and reading the new data based on the lookup table configured to map a logical address to a physical address. If the state data associated with the logical address indicates an empty frame, a memory at the physical address may be populated with data representing empty data. The method may also comprise optimizing the device, including writing to a write block having a fewest active blocks and writing meta data associated with each write block, wherein existing live blocks are packed to a front of the write block and rewritten to the device.

In another embodiment, a block storage device is directed to optimizing data access and update patterns. The device may comprise a segment of known data in logical and linear order; a further segment of free space for the acceptance of updates; and a logical area for storing update reference changes, wherein each logical address in the logical area is associated with different state data for representing whether a memory of the logical area is empty. The device may further comprise a CPU configured to perform the method(s) for using the state data described above.

In another embodiment, a method is directed to fast data storage on a block storage device. The method may comprise receiving new data to be written to an empty write block. If the new data is compressible, a portion of the new data and a count is written into a portion of meta data associated with the new data, wherein the written portion and the count are configured to decompress into the new data. The method may further comprise tracking a location of the new data; and writing meta data associated with the new data. The method may also comprise updating a lookup table based in part on the meta data; reading the new data based on the lookup table configured to map a logical address to a physical address; and if the meta data associated with the logical address indicates a compressed frame, providing a decompressed version of the new data based on the meta data.

In another embodiment, a block storage device is directed to optimizing data access and update patterns. The device comprises a segment of known data in logical and linear order; a further segment of free space for the acceptance of updates; and a logical area for storing update reference changes, wherein each logical address in the logical area is associated with different data for representing a decompressed version of data if the data is compressible. The device may further comprise a physical address lookup table comprising at least one field comprising a physical address indexed by a logical address, wherein the at least one field further comprises a compression data field usable for storing a compressed version of data stored at the physical address. The device may be configured to perform the method(s) described above for managing compressed data.

In another embodiment, a method, system, and device are directed to managing memory and/or a memory device. The method may comprise configuring the memory device for a lifetime period; performing a plurality of disk operations within a cycle; determining a device-erase-sector-count for the performed plurality of disk operations; determining a write speed-limit based on the lifetime period of the memory device, a projected number of life cycles for the memory device, and the determined device-erase-sector-count; and slowing a write speed for the memory device based on the determined write speed-limit. The method may further comprise writing new data to an empty block, wherein writing further comprises performing a time-out if a current number of writes exceeds the write speed-limit. The method may also comprise tracking a location of the new data; and writing meta data associated with the new data. The device may be configured to perform the steps of the method.

BRIEF DESCRIPTION OF THE DRAWINGS

The features, aspects, and advantages of the present invention will become better understood with regard to the following description, appended claims, and accompanying drawings, where:

FIGS. 8A-8B show embodiments of logical flow diagrams for mounting a block storage device;

FIG. 10 shows another embodiment of a logical flow diagram for writing to a block storage device;

DETAILED DESCRIPTION OF THE PRESENT INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

The Fast Block Device and associated methodology according to the present invention is a device mapping layer that has a completely different purpose than that of standard block devices. Instead of being a simple linear translation of a logical block number to a physical device address, the Fast Block Device and associated methodology dynamically re-map the data to optimize data access and update patterns. This dynamic re-mapping can be used with a variety of storage devices to achieve massive performance improvements over a linear mapped device, as well as other benefits for certain specialized types of hardware. For instance, when the Fast Block Device concept is applied to flash memory, the speed of random writes made to that device can be increased by almost two orders of magnitude.

While existing devices overwrite existing blocks of data, and thus are forced into random writing patterns, the Fast Block Device of the present invention writes to open free space in a linear manner. It writes data in the order it is received because this is an efficient manner of assuring data integrity by assuring that older data is written before newer data. Any linear order could be imposed. The innovative Fast Block Device presented herein remembers the exact location of each newly-written component, in the process "un-re-membering" the older copy, and also has elements that allow for the purging and removal of expired data superseded by newer copies, as needed, or during quiescent periods so that, unlike a journal or log, one cannot run out of space, but will rather stay within the allotted Block Device.

Because the Fast Block Device can re-map data on the fly, the actual mapping information is stored with the data blocks themselves. Each cluster of data is stored with "meta information," "meta data," or "control data" that describes which blocks are actually stored where. This meta information occupies sectors on the storage device and is optimized to use a minimal amount of space.

Figure 1:
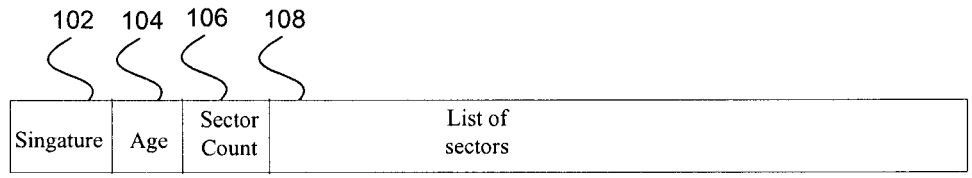
FIG. 1 shows an embodiment of a control block.

In one embodiment, as shown in FIG. 1, the meta information includes a signature 102, an "age" 104 so that "newer" data is recognized as valid over "older" data when a Fast Block Device is mounted, a count 106 of the number of data blocks that follow, and an array 108 of the logical block number(s) for the data blocks following.

Figure 2:
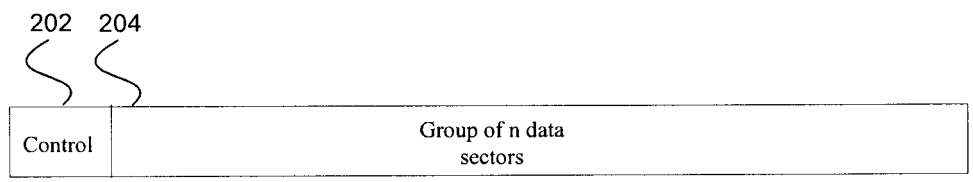
FIG. 2 shows an embodiment of a write segment with a control block.
Figure 3:
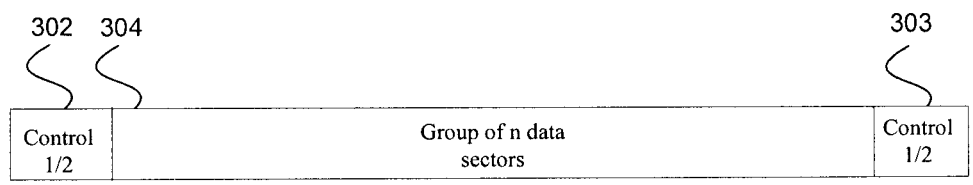
FIG. 3 shows an embodiment of a write segment with a split control block.

As shown in FIG. 2, as a minimal implementation, the meta data 302 is followed directly by the data blocks themselves. As shown in FIG. 3, a better solution is to split the meta data into the sector(s) 302-303 that both precede and follow the data storage blocks 304. The meta data may be split in any proportion (e.g., 50/50, 60/40, etc). This way, failures during device writes can be detected and the ambiguous data discarded.

Each of these meta-data and data-block sections are then stored in larger storage units called write blocks or simply "blocks". In one embodiment, these larger units are designed to match or be a multiple of any natural write unit that the storage device hardware may impose. For example, NAND-based flash drives have an "erase block" size and the Fast Block Device should be setup to maintain these write blocks as a multiple of the flash erase block size. Similarly, for many hard drives, it would be set up to correspond to the track size.

Depending on the sector size, block size, and write block size, a write block might be represented by a single write cluster or might be represented by several. This depends on whether the meta data will fit into a physical sector representing the entire write block, or just a portion of it, and the degree of control obtained over the device. For instance, if one can gain direct access to NAND memory, rather than going through the control routine of a vendor trying to make NAND appear to have the function of a hard disk drive, one can nominally write single blocks in a linear fashion, writing each sector in real time, rather than as a linear group, and thus assuring a machine with greater data integrity at a given point of failure.

Figure 4:
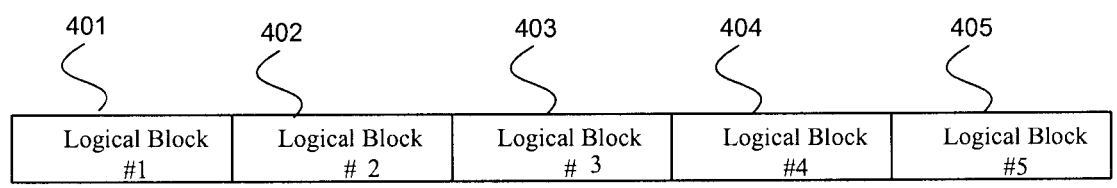
FIG. 4 shows an embodiment of a lookup table.
Figure 5:
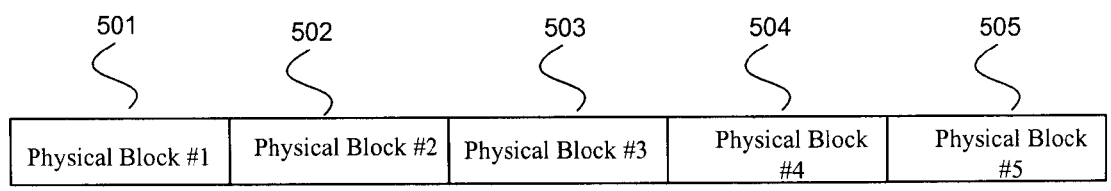
FIG. 5 shows an embodiment of a reverse lookup table.

In one embodiment, a Fast Block Device implementing the invention may maintain three sets of tables (e.g. FIGS. 4-6), block driver internal tables, in RAM that allow for fast lookup of stored information. As shown in FIG. 4, the first table allows an application to look up the actual current location of any logical block. As shown in FIG. 5, an optional reverse lookup table lets the Fast Block Device lookup what is at any particular physical location and determine if it is still in use or expired. These bidirectional lookups are constantly updated as the mapping dynamically changes.

Figure 6:
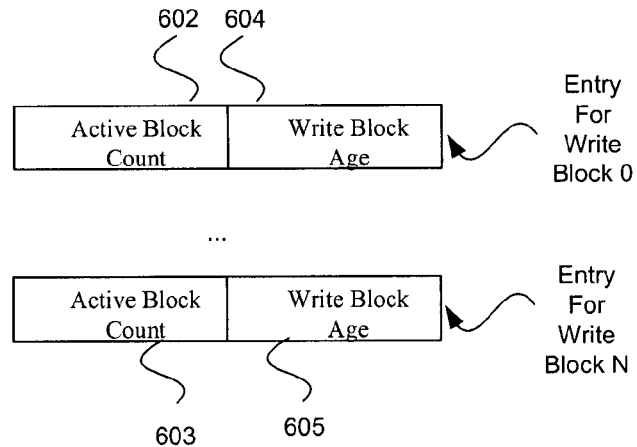
FIG. 6 shows an embodiment of a write block lookup table.

The Fast Block Device also maintains a third table, a write block table as shown in FIG. 6. This table enumerates the contents of each write block on the device. The table includes the count 602-603 of active blocks in each write block, plus the "age" 604-605 of the data in the write block. This table allows the device to determine which write block or blocks may be written to most effectively, in that those most-empty of real data can be most efficiently written to using a linear write.

It should be understood to those of skill in the art that the Fast Block Device and methodology of the present invention has performance and reliability advantages in a number of application and hardware scenarios because it converts random writes into linear writes which are often several orders of magnitude faster than random writes.

When used with NAND-based flash drives, the Fast Block Device can dramatically improve overall application performance for applications that use large numbers of random reads and writes by improving random write performance, for example:

| | |
|---|---|
| Random Reads | No performance change |
| Linear Reads | No performance change if the blocks were written linearly. Minor performance degradation if the blocks were written randomly. |
| Random Writes | Very large performance improvement. In many instances, write performance will increase 100-fold. |
| Linear Writes | Small performance degradation because of meta data management. |

One side-effect when used with NAND-flash drives is that the number of erase block operations to the drive is minimized reducing wear. This is important because NAND-flash can accept a limited number of erase-block operations before it fails. For low-end NAND memory, failure may occur after 10,000 write cycles. In high quality memory the failure point for erase block operations raises to the level of a million or so. For many applications that do large numbers of small writes, the Fast Block Device can reduce the number of NAND-flash erase operations, often by a factor of 50 or larger.

For an 8G flash device rated at 1,000,000 write operations, as little as 4 gigabytes of 4K writes to the same logical block can cause the device to fail. Thus, things such as swap-space operations can, if applied to flash-memory, wipe out the capacitance of that memory in just a few hours. When addressed as a Fast Block Device, this same device can at worst handle over 200 gigabytes of write operations to a single sector because that sector will no longer be tied to one physical spot, and because writing leading to a required erase-block operation will occur less frequently.

In a more typical enterprise application, and assuming that the device does "load leveling" across all erase blocks, one can expect to write about 3 petabytes before an 8 gigabyte device wears out. With most applications, this would take many years of continuous, and saturated, writes.

Even worst case applications like swap partitions that are notorious for killing flash devices are practical when mapped through the Fast Block Device. Plus, swap runs fifty times faster when swapping to flash directly.

When used with flash media, the inherent space consolidations methods of Fast Block Device can return no-longer-used frames to a null, all-zeros condition, thus reducing the chance of unlinked data becoming inadvertently exposed because it is not scrubbed, a security advantage.

When the Fast Block Device is used with traditional rotating media, i.e., hard disk drivers and hard disk arrays, a performance shift is experienced that can be very advantageous to applications, such as database environments, that employ large numbers of random reads and writes. In general, with rotating disks, the Fast Block Device can be expected to:

| | |
|---|---|
| Random Reads | No performance change |
| Linear Reads | No performance change if the blocks were written line linearly. Significant performance degradation if the blocks were written randomly. |
| Random Writes | Large performance improvement, typically of 40 to 50 fold. |
| Linear Writes | Small performance degradation because of meta data management. |

The Fast Block Device and methodology of the present invention can also be used with a RAM-based storage table, plus a disk-based backing device, forming a hard disk hybrid solution. The RAM storage is used for reads and the disk drive is used to real-time store updates at linear speeds which are fifty-fold faster than random write speeds. This gives the performance of a RAM disk with the non-volatility of a standard hard disk drive, for example:

| | |
|---|---|
| Random Reads | Run at RAM speed |
| Linear Reads | Run at RAM speed |
| Random Writes | Run at disk linear write speed |
| Linear Writes | Run at disk linear write speed |

As is shown, this solution produces the fastest Fast Block Device possible, but at the cost of RAM. The advantages of a Fast Block Device in conjunction with RAM is greater media concurrency and selectively higher transfer speeds. Standard RAM technologies presume that the disk drive is not updated until the system is shut down. This creates a risk in the event of battery failure, and may, in some designs, also result in a situation where the RAM drive cannot be used until all of the disk has been read into memory. Conversely the Fast Block approach assures that the system is fully physically saved to within 2 seconds of even an irregular catastrophic shutdown, while making the drive available within a few seconds of a system boot. In addition, because Fast Block can be implemented within the system itself rather than as a separate device, read times can actually be faster for core memory resident "disk."

Figure 11:
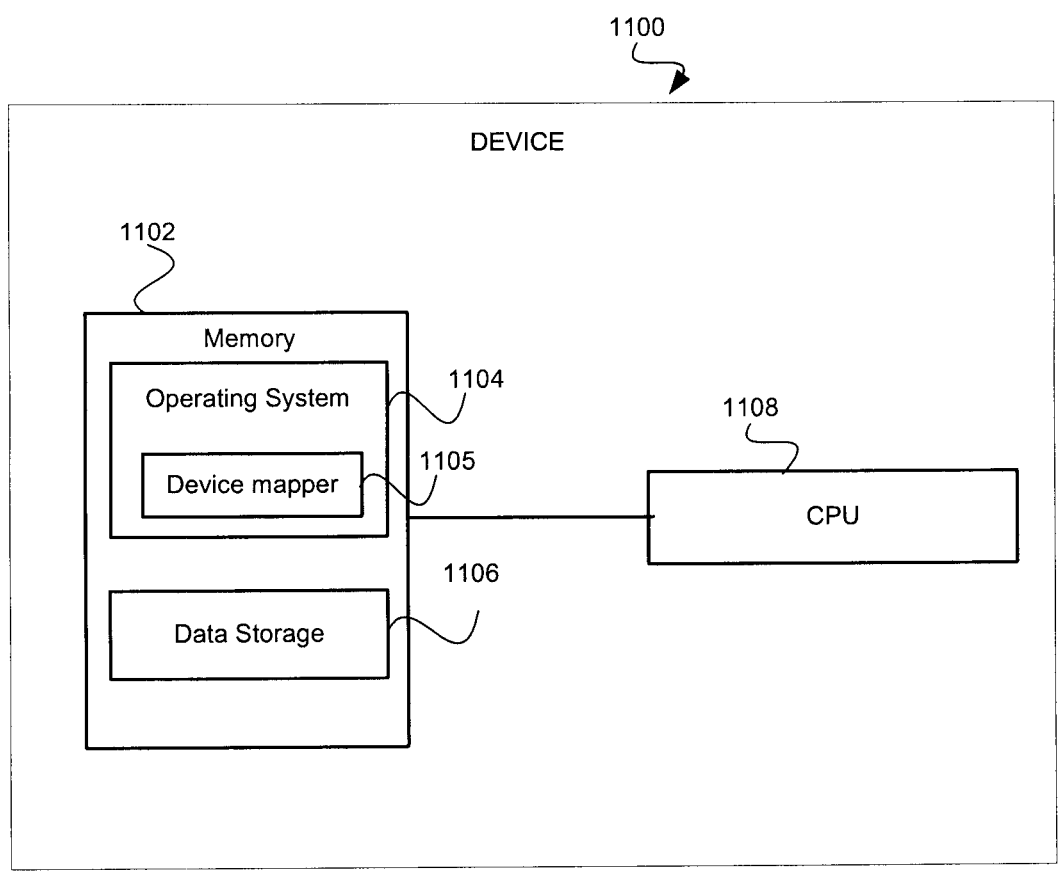
FIG. 11 shows one embodiment of a fast block device.

FIG. 11 shows one embodiment of a Fast Block Device. As shown, device 1100 comprises memory 1102, operating system 1104, data storage 1106, and CPU 1108. However, other embodiments may comprise more or fewer components without departing from the scope of the invention. For example, in some embodiments, device 1100 may not include a CPU 1108 and/or an operating system 1104. Operations of device 1100 may be performed by dedicated hardware, such as an Application Specific Integrated Circuit (ASIC) (not shown), or the like. In some embodiments, device 1100 may be a NAND-flash drive, an 8G flash device, a ram based storage table, a disk-based backing device, a storage appliance, or the like. In one embodiment, data storage 1106 may be RAM, a disk drive, RAM/Disk drive hybrid, an external storage device, a flash drive, EEPROM, or any other data access component. In one embodiment, data storage 1106 may store at least some write blocks for use with the present invention. The write blocks may be configured as shown in FIGS. 1-3. Memory 1102 may store the regular table of FIG. 4, the optional reverse lookup table of FIG. 5, and/or the Write Block table of FIG. 6. Device 1100 may perform the operations described in FIGS. 7-10.

As discussed hereinabove, the Fast Block Device 1100 and methodology of the present invention can be implemented at many different layers. For example, it is possible to implement the Fast Block Device in the application itself, as a "device mapper" 1105 in the host operating system 1104, as a part of the device itself, and/or as a part of a storage "appliance" that is external to the primary computer system (not shown).

In referencing a "storage appliance," presumption should not be limited to the classic idea of a drive "appliance," which would typically comprise a server box holding a large number of drive devices of the same class. Rather, one should think in terms of both micro-devices and of composite devices. For instance, if one were to combine two flash drives together with a traditional 2.5 inch hard disk drive as a parity drive, one could build a composite device that would function as a raid-4 assembly that had the same overall performance characteristics as a raid-4 assembly made purely out of flash memory materials. Similarly, one could build the entire highly reliable assembly in a traditional 3.5" form factor.

Similarly, the technology of the instant invention can be applied at an application level and can cover a portion of the disk (e.g., data storage 1106). As an example at an application level, this technology might be applied to the problem of swap space stored on disk. Currently, updating this space can be slow because of the problem of random writes. Responsiveness of this application can be improved by an estimated factor of twenty if this technology is used to replace massive numbers of random writes with linear writes.

The benefits of the Fast Block Device and methodology of the present invention are many. For example, when used with NAND-flash storage devices, write performance is greatly improved with little or no read penalty, and drive durability is greatly improved also. Further, use with standard hard disks allows applications that generate small random writes to run at drive linear write speeds with no special hardware required. Finally, when used as a RAM/Hard Disk hybrid, RAM performance for all reads increases, linear disk performance for all writes increases, and a persistent ramdisk is created without requiring any special hardware.

The following is a general description of device implementation and operations pursuant to the teachings of the present invention. Of course, as understood by one skilled in the art, the actual implementation of the device may vary depending upon the hardware the device is mated with and the intimacy that can be achieved with the underlying hardware.

By way of definitions, the following describes some currently performed definitions of various terms used in conjunction with the description of the present invention.

Sector: One storage unit on the device, e.g., a physical sector (512 bytes) or some multiple depending on the formatting parameters that were chosen. Many current systems favor either two kilobyte or four kilobyte sectors.

Control Area or Control Block: As shown in FIG. 1, typically one storage unit (Sector) of data comprises a signature 102, and aging counter 104, a count of data area blocks 106, and a list 108 of logical sectors that are stored on the device "here".

The control area might be a single storage unit (Sector) in front of the logical data (See FIG. 2), or it may be split into two halves (or other proportions), one in front of the data and one behind (See FIG. 3). If it is split, then there are two signatures and two aging fields. The advantage of splitting is that this is a mechanism of assuring that the write of the control area and associated data area is complete. If not complete, corruption of the second half will be apparent. Writing of a split control block does not require extra storage space. Rather, each data area element can begin at a known byte offset from the associated basepoint.

A Control Area can also extend over multiple Sectors if enough data is written in a single operation and this additional space is needed to store the array of logical Sector numbers.

Data Area: This is the area where actual data is stored (e.g., 204 and 304). It is the same overall size as the sum of all the data sectors being written. The data area immediately follows its control area. In the event of a split control block, it is immediately followed by the second half of the control area.

Write Blocks: A write block is data of a size of an area that is written at one time. In NAND-based flash devices, it should be the size of, or a multiple of, the inherent erase bloc size of the device. NAND-based flash devices that are a part of an array would require Write Blocks sizes that would cause the array to write each devices erase block on a boundary. Thus, in a four drive RAID-5 array, the write block is properly three times the erase block size.

With other devices, the Write Block should be large enough to achieve linear write performance and thus will approximate a track length, or a multiple of tracks if a RAID device is used.

Write Segment: A write segment comprises of a Control Area followed by a variable-length Data Area (See FIGS. 2 and 3). Under normal circumstances with heavy write usage, a write segment will equal the length of a write block. However, in order to assure that physical writing of data is timely, the system will typically have a timer that assures that what ever has accumulated in the last several seconds will be written even if enough contents have not accumulated to fill a Write Block.

In such a circumstance, several Write Segments may be written to the same write block successively. As long as all segments are written to the same Write Block sequentially they will all have the same age. Similarly, as is consistent with the concept of transaction logging, in a highly volatile logical block, several copies of the same block may occur in succeeding segments. However, the tables, as discussed later, will keep track of which physical block represents the most current copy of a particular data block.

Active Write Block: An area of memory, the size of a Write Block, where writes are buffered.

Unlike data in a Transaction Log, data stored in the Fast Block Device can be found, comparatively rapidly in an absolute sense merely by examining all of the control blocks on the device. However, such a scanning method, even while immeasurably faster than beginning to ending read of media, is not suitable for real time retrieval of data. To achieve real time translation, what is required is a series of tables to translate logical references into real physical locations as well as to determine whether real physical locations contain currently active data, null contents, or older, and now inactive data that can be purged.

As shown in FIG. 4, the regular lookup table identifies exactly where a logical block currently physically resides on the physical block device. For example, cell 401 stores the physical location of logical block # 1, cell 402 stores physical location of logical block # 2, and so forth. Typically, this table will reside in the main memory 1102 of the CPU 1108 which is managing the individual device, or a group of such devices. Memory may have a sufficient number of bits to remember every possible physical location on the physical device, or devices, being managed. In one embodiment, if a sector address in the table is not populated and referencing an explicit physical frame, it returns all zeros.

As shown in FIG. 5, the reverse lookup table identifies the logical block to which every physical block (i.e., sector) of the physical device, or devices, references to. For example, cell 501 stores the logical block of the physical block # 1, cell 502 stores the logical block of physical block # 2, and so forth. If a specific physical frame does not equate to a currently active logical frame, the system will be informed by having all zeros returned to its query.

As shown in FIG. 6, the Write Block Lookup Table has one entry per write block. For example, FIG. 6 shows entries for write blocks 0 to N. This is a comparatively small table. For instance, a 32 gb flash drive with 500 kilobyte erase blocks would have 64,000 of these, compared with millions of sectors. The write block lookup retains a total count of active blocks, as well as the age of the write block.

Each entry has an active number of blocks field (602-603) which is the sum of all sectors of data in the write block, less any of those sectors that have been made redundant by a later update of the same logical sector (which would be written somewhere else, given that Fast Block Device may not overwrite).

Each entry has an age which is an incremental value, beginning at zero, and incremented every time a new block is accessed for purposes of writing new contents.

Figure 7:
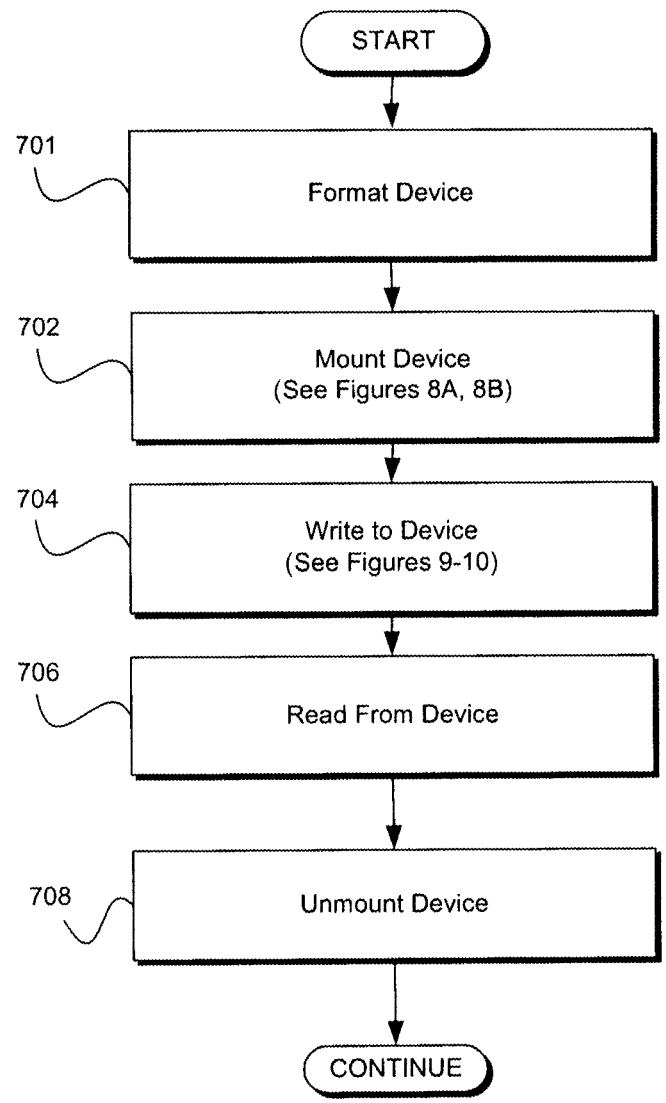
FIG. 7 shows one embodiment of a logical flow diagram for fast data storage on a block storage device.

In the following section of the specification of the present invention, the general functions of the Fast Block Device will be described, with particular notice taken of special conditions that may occur in selected hardware scenarios. One embodiment of a process for performing the operations of the present invention is shown in FIG. 7.

It should be understood that in order to use a device, it must be initially formatted. Briefly, this involves writing an empty control sector at the front of each "write block". After the device is formatted, all logical blocks are unallocated, so the device basically reads zeros initially.

Figure 8A:
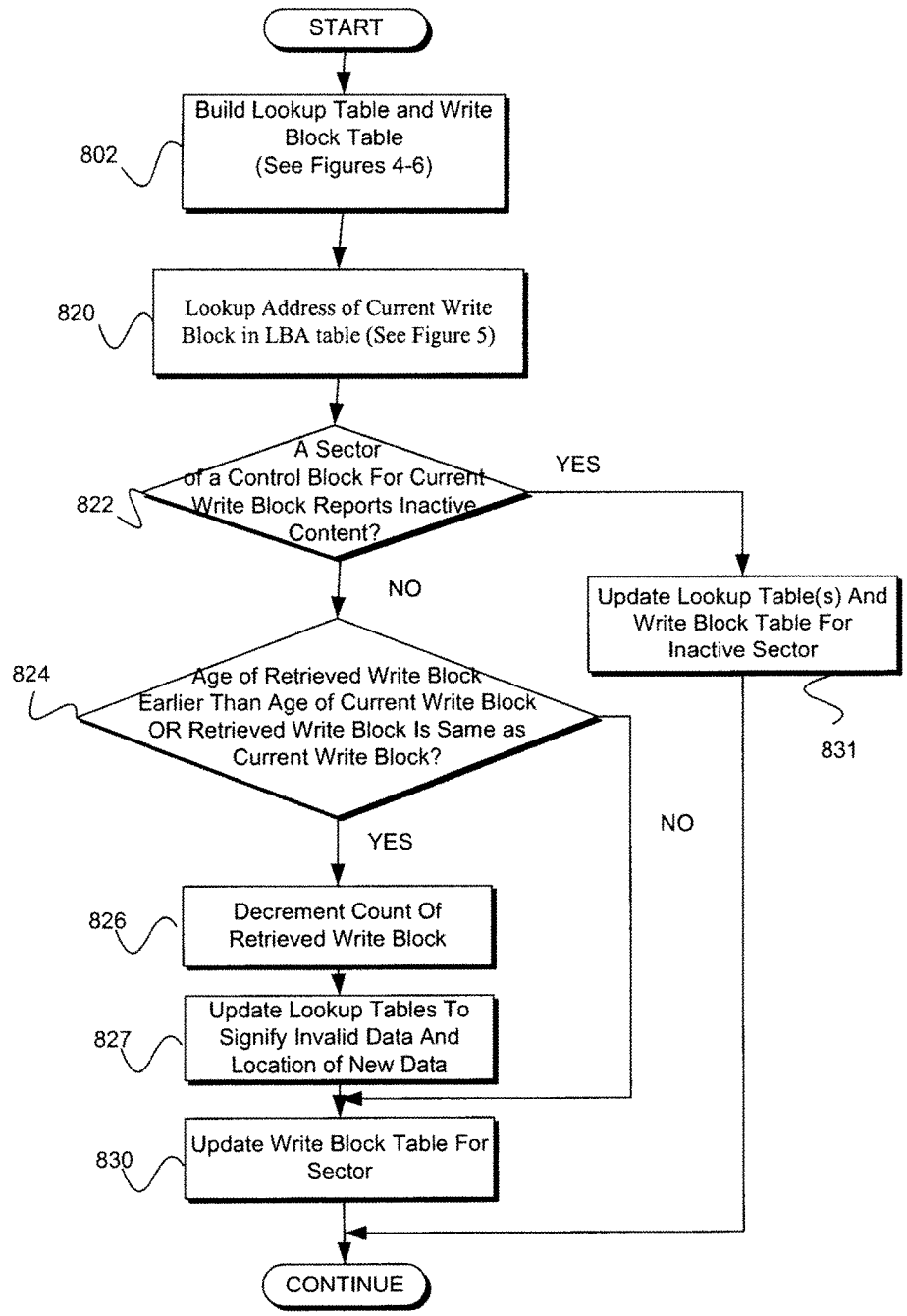

Because the sector mapping of a Fast Block Device is dynamic, the device must be "mounted" before it is used. FIG. 8A shows an embodiment for mounting the device.

At block 802, the mount process starts out by building the three internal lookup tables and zeroing them out. It then reads the Control Area for each Write Block. When this area is read, it first reads the control area of the first Write Segment of the Write Block. It then builds the write block table entry (FIG. 6), referencing the age portion of the table. It then parses the list of sectors in the Control Area. Each referenced Sector is translated through the regular lookup table (FIG. 4). At block 820, an address for the current write block is looked up in the lookup table(s) (see FIG. 5).

At decision block 822, it is determined if the sector reports inactive contents (a zero condition in the lookup table). If so, processing continues to block 831 where the lookup table (FIG. 4) is updated with the new contents. The reverse lookup references the physical frame. Finally, the write block table (FIG. 6) is incremented to indicate an additional consumed frame.

Conversely, if at decision block 822, it is determined that the sector reports active contents (a non-zero condition) in the lookup file (FIG. 4), the physical reference is then translated into a write block reference (as each write block has a known number of Sectors). The write block is then looked up in the relevant table (FIG. 6).

At decision block 824, it is determined if the age of that write block is earlier than the current write block, or if the write block referenced is the same write block as the current write block. If not, processing continues to block 830. Otherwise, at block 826, the write block which now has an unusable sector has its active count of sectors decremented (FIG. 6). Subsequently, at block 827, the new physical referent is referenced in the lookup table (FIG. 4). Similarly, the Backward lookup table (FIG. 5) is now updated both by setting the old sector reference to all zeros, and by referencing the logical frame in the proper point. Finally, at block 830, the new table referent in the Write Block Lookup (FIG. 6) has its counter incremented.

Processing loops back to block 820, until all the elements in the list part of sectors of the control area have been thus computed. The system then checks recursively to see if there is a next Write Segment in the Write Block, and if found, repeats the posting process.

On flash drives, the current time to mount a drive may be several gigabytes per second. Thus, in some embodiments of the invention, a 32 gb drive can be mounted in about fifteen seconds.

FIG. 8B shows an alternate embodiment of and elaborates on the steps of FIG. 8A described above. Like step/block numbers represent similar processing. As shown, FIG. 8B shows a routine for reading a device header record. Processing begins at step 802, where tables (FIGS. 4-6) are initialized to empty.

At step 804, processing begins to loop through each write block. For each Write Block, at step 806, processing begins to loop within a Write Block until the end of the Write Block is reached.

For each iteration of loop 806, processing begins at step 808. At step 808, Meta Information/Header is read at the beginning of an address array.

At step 810, it is determined if the header is invalid. If so, processing skips to the next Write Block (go to step 836).

At step 812, a size and location of the rest of Address Array and Meta Footer (2nd half or portion of meta information) is calculated.

At step 814, the rest of Address Array and the Meta Information Footer (if one exits) is read.

At step 816, if the Meta Information Footer does not match the Meta Information Header, processing skips to the next Write Block (go to 836).

At step 818, processing loops through each address in the Meta Array (addresses associated with the Meta information). For each iteration of loop 818, processing begins at step 820 where an Address in a LBA table (lookup table(s); See FIG. 5) is looked up.

At step 822, it is determined if the address exists. If so, processing continues to step 824. Otherwise processing continues to step 828.

At step 824, it is determined if an existing address is newer. If so, processing skips to the next Address (go to 832). Otherwise, at step 826, the existing address is removed.

At step 827, a fill counter(s) associated with the Meta Information for the existing write block is decremented.

At step 830 the LBA (lookup table(s) of FIGS. 4-5) is updated with the new address and the fill counter(s) for this block (associated with address in Meta Array) is incremented.

At step 832, loop 820 is repeated for all address in the address array.

At step 834, loop 818 is repeated until the end of the write block is reached.

At step 836, loop 804 is repeated for all write blocks.

Processing then returns to other computing.

Referring back to FIG. 7, at block 704, data is written to the device. The write process may be complex because it comprises reconstruction of and appendation to a current write block. In order to make this process extremely clear, it will be described in its logical steps below in conjunction with FIGS. 9-10.

At block 706, the device is read. Read operations are very simple. Data is either present and in a known location because of the initial mount and subsequent properly documented writes, or a particular sector has not been written to.

When the read request comes in from the application, a lookup is made for the logical sector in the lookup tables (FIG. 4). If the sector is present, a read is issued to the device using the lookup location. If the sector is not present, a data block of zeros is returned.

Read operations can lookup sectors that are in the Active Write Block. In this case, the data in the Active Write Block is used instead of actually reading from the device. The reasons for doing so are both efficiency and data integrity. Until update is confirmed, it is uncertain whether the data is actually present.

At block 708, the device is unmounted. In one embodiment, unomounting may comprise writing to each write block and writing meta data associated with each write block. Because the data and meta information is written simultaneously, and can be written in update sequence order, an unmount operation may not required. Because the Fast Block Device does delay writes for a short time (typically less than 2 seconds), a "flush" command to force writes out prior to a power down might be appropriate for some applications and platforms.

The write process is complex because it requires reconstruction of and appendation to a current write block. In order to make this process extremely clear, it will be described in its logical steps. Once the general steps have been described, the refinements will be described.

Figure 9:
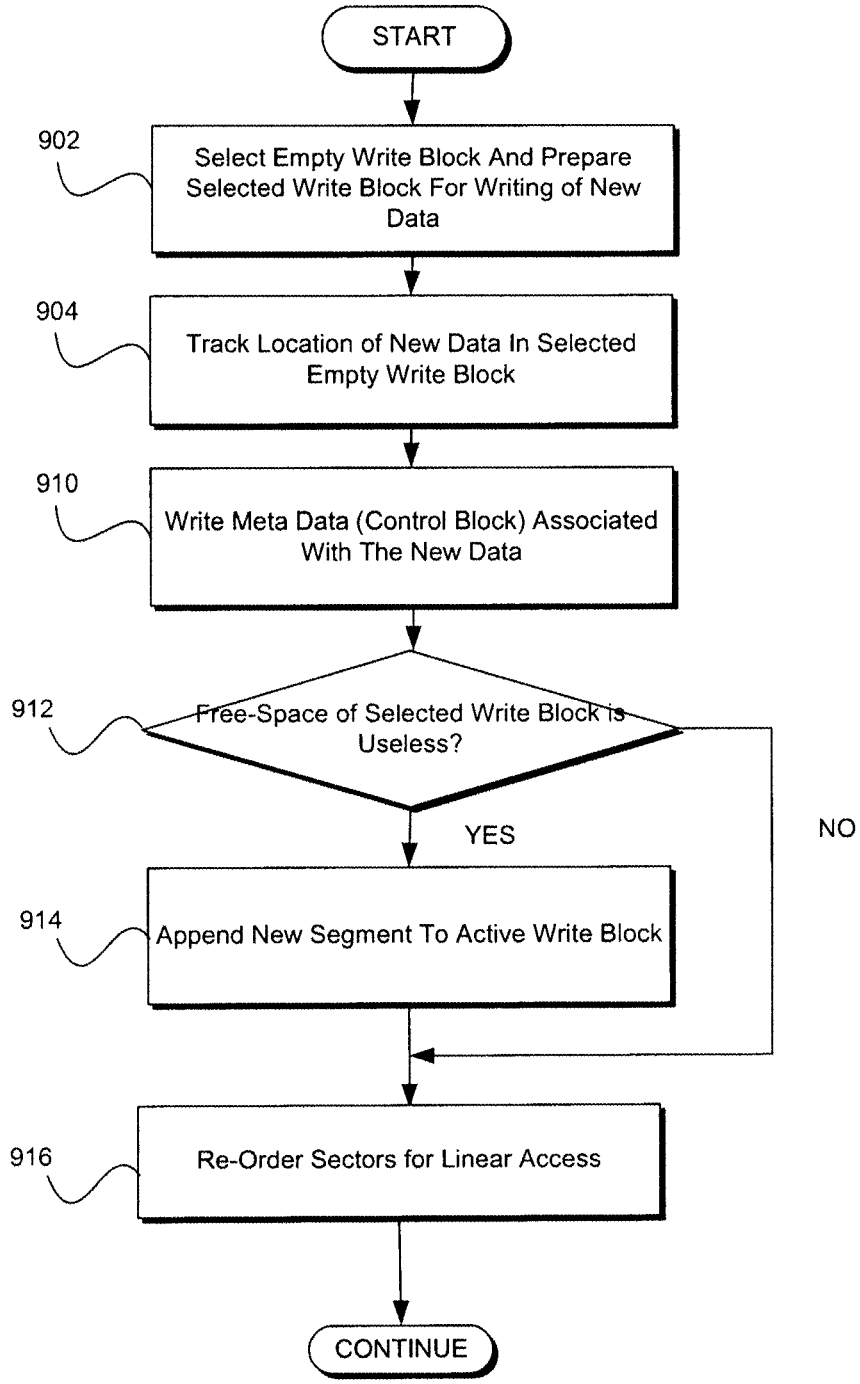
FIG. 9 shows one embodiment of a logical flow diagram for writing to a block storage device.

FIG. 9 begins at block 902, where an empty block is selected and prepared for writing of new data. In one embodiment, it may be determined which block in the system is most empty. This is done by consulting the Write Block Table (FIG. 6). By comparing all of the cells in this table, it is possible to determine which Write Block has the most free space. An enhancement of this to create a series of indices of the different fill levels can optimize this process.

Once selection has been made, at block 904, the location of the new data in the selected empty block is tracked. A segment of memory is cleared to accept both its old contents and any new contents. This segment has been referred to above as the Active Write Block, and comprises both a series of data blocks that may be written, as well as an actively constructed Control Area sector, as described in FIG. 1.

Once a particular Write Block has been selected and cleared, its active sectors—those containing still-current data—are read into memory in consolidated order. The determination and reading is done via an extension of the comparison process described in the Mount operation. However, those sectors containing Control Area information or actual still-current data still have to be read. The read process is inherently linear and extremely fast. However, the non-reading of some sectors reduces data congestion in the pipe.

Such Data as is read will be moved, sector by sector into the Active Write Block. Similarly, the meta-data or control block is built by appending the logical frame numbers to the list and incrementing the quantity of active Sectors referenced. As New Sectors are received for writing, these are appended to the Active Write Block by writing the new data to the Active Write Block while updating the Control Area Sector (meta-data).

At block 910, the meta-data (control block) associated with the new data is written. In one embodiment, once the Write Block is full, the write block (comprising the meta-data/control block) is immediately written as a linear write. The Write Segment, in this case, is equal to the size of the Write Block. In one embodiment, the process may then proceed to selection of a new Write Block.

For writes as a result of turnout, an adjustable timer allows premature write of a portion of a write block even if the write block is not full. Typically, this will be set to occur if there has been actual data to be written within the last two seconds, but not enough new data has been encountered to justify generation of a full Write Block. In this case, what is written is a Write Segment shorter in length than the actual Write Block.

At decision block 912, it is determined if, at the end of this segment writing, still-free space is useless (such that, for instance, only one sector is free). If so, the process will proceed to selection of a new Write Block at block 902. Otherwise, at block 914, a new segment will be appended to the Active Write Block. This segment, comprising a Control Area Sector and a series of newly-to-be-written data blocks will continue until it, in turn, reaches a condition where either the Active Write Block is full or where another inactivity timeout occurs.

Actual Writing of the block, or writing of the first Write Segment to a Write Block, is done to an empty block. Thus, if the system crashes for any reason, the newest data may be lost. All earlier data is preserved. When a Write Block is closed out and before a new Write Block is determined. The extant write block which was the source of merger is, if not already empty, purged and written with a zeroed control block.

It has been noted that quiescent consolidation process will dramatically increase average writing speed but, in some embodiments, the disadvantage is that older, expired, data blocks will remain extant and that similarly there will be excess Control Area Sectors as a result of timeouts and the segmentation process.

Similarly, an efficient mechanism of writing data is to write it to a totally empty Write Block. A situation where, for instance, all blocks are seventy percent full will be less write efficient than a situation where seventy percent of the blocks are totally full and thirty percent are totally empty.

The accumulation of garbage, and the advantages of imbalance suggest the need for an ongoing process to build these optimums by an ongoing process of taking several partially-full Write Blocks and consolidating these into full blocks or empty blocks. All this can be obtained as part of the write process described above. Similarly, the same can be done without hindrance to newly to-be-written data as the quiescent process can be interrupted to accept new write Sectors as part of an Active Write Block in favor of consolidation of an existing set of blocks.

As described hereinabove, where leveling involves watching for "active" areas and "static" areas and moving the data around on the storage device to spread flash erase operations around.

At block 916, sectors may be re-ordered for linear access. Restoring linear sectoring ordering may not be necessary when dealing with randomly accessible storage devices like RAM and Flash RAM. In the case of using the Fast Block Device with a rotating disk drive, this involves scanning each Write Block and deciding if the order is fragmented "enough" to justify re-ordering. If re-ordering is deemed desirable, then linear Sectors are read from the device and then re-written. Reordering sectors for linear access patterns may be combined with coalescing Write Blocks in that re-ordering into partially filled Write Blocks will be ineffective.

In an alternate embodiment, when Fast Block Device can be used intimately at the chip or component level, the nature of implementation can change profoundly to improve performance, efficiency, and reliability. For instance, if the technology is implemented with NAND Flash Memory chips directly, such that the Flash can be treated as memory rather than disk, one can get rid of the reverse lookup table entirely. Similarly, one can change the structure of the Control Area, appending to the list of logical IDs in real time while also updating the data areas in real time. Thus, the entire system can receive random writes and linear writes and dispose of both at near the linear write speed of the device. Similarly, the nature of this design, and the use of intelligent processors, allows building of a composite assembly that has greater reliability and speed, and lower cost. For instance, when flash is managed in this manner at the system level, it is possible to think of four "drives" instead of one, each of which is a removable card. Thus, one can think of a RAID-5 assembly in a very small format reading and writing at collective speeds far faster than the inherent NAND Flash itself, together with faster I/O pipes such as the fastest SCSI interface to the parent device. Conversely, one can do this while leveraging other cost advantages such as somewhat lower quality or larger erase blocks. For instance, the inherent nature of Fast Block Device allows use of 1, 2, or 4 megabyte erase blocks in the same manner as the current 500 kilobyte blocks.

FIG. 10 shows another embodiment of a logical flow diagram for writing to a block storage device. FIG. 10 describes an alternate embodiment and an elaboration of FIG. 9 described above.

FIG. 10 begins at subroutine Write at step 1002. At step 1002, it is determined if no space exists in the current Write block. If so, processing continues to the subroutine Write-Push at step 1010. WritePush returns after appropriate processing.

Processing then continues to step 1004, where at least a portion of the block is tested to determine if it is cleared. For example, the block is tested if it comprises the hexadecimal number 0000/FFFF.

At step 1006 the block address is added to the write array.

At step 1008, it is determined if the block is not cleared (e.g., if at least a portion of the block does not comprise 0000/FFFF). If so, the block data is copied to the write buffer. Processing then continues to other computing.

Subroutine Write Push begins at step 1010, where a write buffer is built that comprises at least a Write Header (a portion of meta information), Write Data Blocks, and/or a Write Footer (another portion of meta information).

At step 1018, data is written to the device (Fast Block Device).

At step 1020, a current write position is updated.

At step 1022, it is determined if the Write Position is at an end of the write block. If so, then processing continues to subroutine GetWriteBlock. GetWriteBlock returns after appropriate processing, and processing continues with other computing.

Subroutine GetWriteBlock begins at 1024, where a 100% or substantially empty block is found.

At step 1026, A second 100% or substantially empty block is found.

At 1028, it is determined if the second block is unavailable. If so, then processing continues to subroutine Defrag. Defrag returns after appropriate processing.

At step 1030 a write pointer is setup to a head of an empty block. Processing then continues to other computing.

Subroutine Defrag begins at step 1032 where a block with at least number of active data blocks is found.

At step 1034, meta information is read from disk or other data storage 1106.

At step 1036, meta information is scrubbed and stale and duplicate entries are removed.

At step 1038, processing loops through the remaining data blocks. For each remaining data block, step 1040 is performed. At step 1040, data blocks is written with a standard write routine. At step 1042, it is determined if the loop should continued. The loop is continued until an end of a data block list is reached.

At step 1044, the block with the least number of active data blocks is marked as empty.

At step 1046, processing loops until there is a 100% or substantially empty block. Processing loops at step 1048 and finds a block with fewest active data blocks. If a 100% or substantially empty block is found, processing returns to other computing.

The methods described above exist principally to optimize performance that is strongly oriented towards random I/O such as a server computer would generate. The above-described methods may be embodied as an integrated CPU 1108 on a device to manage multiple devices in servers. However, the methods described above can also be used beneficially in a smaller memory disk.

When the above-described method is loaded as a driver onto a laptop, PDA, or other similar device, then a small flash drive can be optimized using the present method to write faster and fail less frequently. This would have an impact on many applications, including saving mail, such as Outlook®, and caching web pages.

Performance Optimization

In another embodiment of the present invention, performance optimization can be further increased. The above description describes the physical construct of a flash drive or hard disk drive, wherein the setting aside of a specific quantity of physical, non-logically addressable space leads to a performance increase, that in one embodiment is roughly proportional to the amount of physical free space set aside. Thus, for instance, if a flash drive has ten percent of its area set aside as mandatory free space, it will inherently produce a random write rate via linear means equal to ten percent of the linear write speed. Similarly, if a hard disk drive has eighty percent of its (low cost) space set aside in this manner, the drive will write at about eighty percent of the linear write speed without further enhancement, and an array of such drives can approximate the random read speed of a RAM-cache memory system.

However, this raises the question of what to do in a case where this free space has a high cost, as can happen in the case of Flash Media. Are there other means of achieving effective free space while still making this space addressable? This is an important question the drive, then the effective random write speed of the flash media can be at least doubled.

Methodologies to increase such effective space availability have not been implemented or considered previously in the art in general. For instance, some other references describe a manner of using the principal of linearity by storing reference information in the memory sector control-bits fields of at least some flash memory devices. The authors of these references fail to explore means of increasing free space other than through making more real flash memory be "free space." Similarly, the authors of the other references show a lack of understanding about the need for increased general free space, and instead argue for the creation of separate, fully empty erase blocks used solely for the purpose of accelerating long linear writes (i.e., making data elements that are typically half-a-megabyte long, or longer). These authors do not realize that the same could be used to write large quantities of smaller records faster in a linear manner.

The methodologies described herein are not limited to the memory devices disclosed, but instead may be used with any (flash) memory devices to improve (flash) write speeds through a remapping table mechanism.

The systems and methods to be discussed herein cover at least the creation of effective free space though the use either of data compression or through the use of sparse array concepts to express the presence of certain types of data such as sectors totally full of zeros or ones.

The creating of free space is important for several reasons. The first of these is that the more free space present, the faster any writing or cleaning process will run. The second is that the creation of free space can reduce the manufacturing cost of devices per unit of accessible storage by reducing the physical storage media needed to attain adequate performance.

The creation of free space depends from two phenomena. The first is that at least some computers have some level of uncommitted space. The second phenomenon is that a data of significant size other than previously compressed data can be expressed in a more compressed manner and then re-inflated to its original expression.

In one embodiment, there may be some unused space in an operating block device, because when free space totally vanishes, the evoking device (such as a PC's central computing unit) has nowhere to put data expressed as files. Indeed, when computers run out of space, they often abruptly halt. As a minimum, most operating systems tend to get sluggish and unresponsive when they have less than ten percent free space. Similarly, many systems have vast amounts of free space. It is common these days to find both PCs and servers that have seventy or eighty percent of their disks totally unused.

This empty space is generally expressed either as all zeros or all ones. Similarly, while dirtied space is normally not overwritten when deleted, the use of explicit deletion and zeroing of data, as is common in secure machines, has a trivial cost in the schema described herein and can be executed with nominal performance degradation. In the physical remapping method described in the present application, it is easy to take advantage of this condition.

Embodiments Using Pseudonymous Referents

Figure 4A:
FIG. 4A shows an embodiment of a lookup table (logical block table) configured to provide state data about an empty block.
Figure 6A:
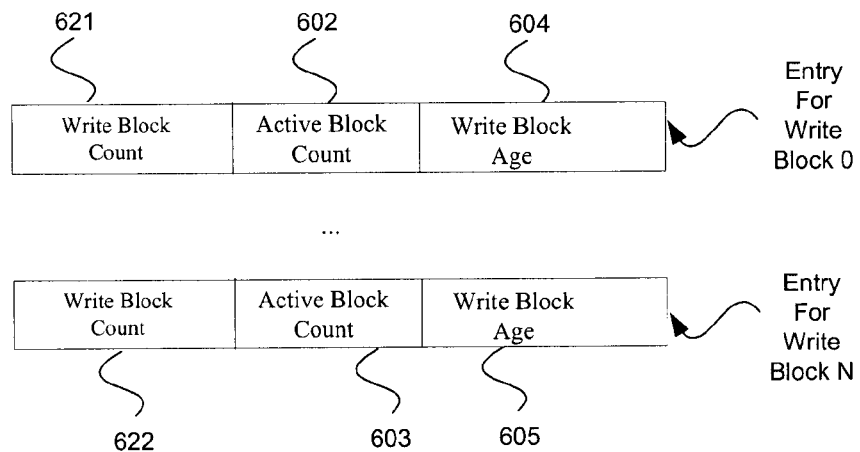
FIG. 6A shows an embodiment of a write block lookup table configured to provide pseudo data/state information about an empty block.

In one embodiment, state data 422 (e.g., two state bits) are added to the appropriate descriptions of the primary translation table per managed logical sector, as shown in FIG. 4A. FIG. 4A shows an embodiment of a lookup table (logical block table) configured to provide state data about an empty block. In one embodiment, a logical value provided by the lookup table is determined by displacement. Field 422 shows current state bits referencing all zeros and all ones (e.g., two may be required). In one embodiment, the field 422 shown may be sufficient to record three primary states: (a) that the data is real, (b) that the data is not physically stored and is all zeros, and (c) that the data is not physically stored and is all ones. Other configuration of data, such as more bits, non-contiguous bits, or the like, may be used without departing from the scope of the invention. This change may also be reflected in the metadata table, as shown in FIG. 6A, by addition of write block counts 621-622 of frames not consuming space. This change may also be reflected in the stored metadata table referenced by FIG. 1A, specifically by including a count of logical sectors 126 that do not occupy space and logical sector list 128 with a longer length than sector list 108 as each of the sector items in FIG. 1A may be recorded with an additional two state bits, and as, optionally, the quantity of items listed in the list may now be greater than the maximum number of sectors physically present in a write block.

Figure 1A:
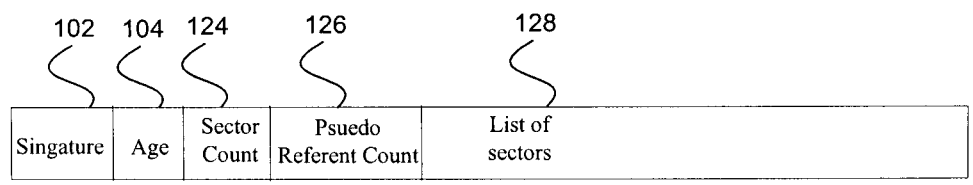
FIG. 1A shows an embodiment of a control block configured to provide pseudo data/information about an empty block.

With these additions, the processes described in FIGS. 8A-8B steps 830/831 may be modified to use the data structures of FIGS. 4A and 1A. At step 830/831 state, data in state data 422 may be examined to scan for the presence of all zeros or all ones and then, if this is so, store the data only as a referent rather than as referent and actual data. Similarly, in FIG. 7, step 706, on reading data, if state data 422 reports the presence of all zeros or all ones, no physical read is performed. Instead, the mechanism populates the sector storage point in memory with the appropriate zero or one value. On writing data, step 1004 of FIG. 10 may be modified to use the data structures of FIGS. 4A and 1A. At step 1004, state data 422 may be examined to determine if the block is cleared (e.g., set to all zeros or all ones). At step 1008, state data 422 may be examined to determine if the data is not cleared, and if so the block is written to the data write buffer. On a mount, as shown in FIGS. 8A-8B, the same process is applied as in a regular mount, but when reading from the metadata list 128, the additional state bits are read and transposed into state data 422. Steps 808-820 of FIGS. 8A-8B may be modified to perform this action.

These methods are ideal because the design permits metadata blocks to consume the entire space of a write block, even if physical data is not present, and thus permits storage of almost 2 gigabytes of empty data in a 4 megabtye erase block. As a result, it achieves the maximum space economy for such empty frames.

Embodiments Using Compression

In another embodiment, the data may be stored as "compressed" data. Data not previously compressed can be compressed. The amount of space savings may depend upon the nature of the data. Specifically, the most compressible data may be a single character repeated for the entire length of a sector. This is a fast and easy mechanism for compression. Thus, in one embodiment, the values 00 and FF (hexadecimal), as well as the common sequences F0, 0F, and indeed any single repeated character, can all be expressed in almost no space.

Figure 5A:
FIG. 5A shows an embodiment of a reverse lookup table configured to provide (de)compression information.
Figure 6B:
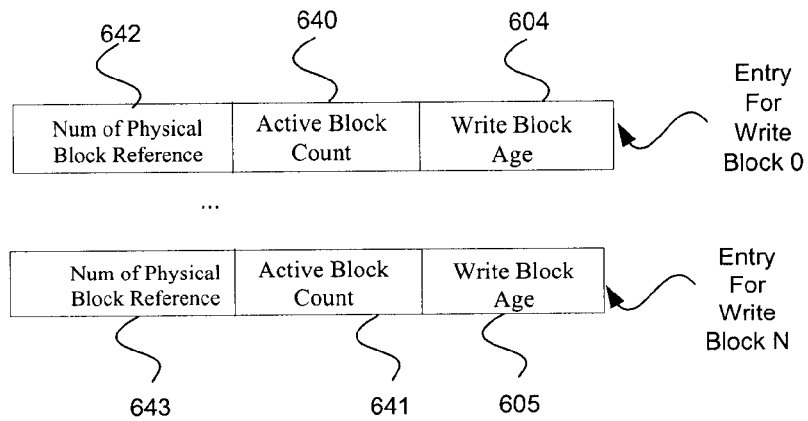
FIG. 6B shows an embodiment of a write block lookup table configured to provide (de)compression information.

Computers may store and retrieve data in four kilobyte chunks. Flash devices may physically store data in 512 byte chunks. Thus, it is possible to conveniently express compressed data using the same block displacement system, but implemented at the 512 byte block level. Thus, it is possible to achieve a practical seven eighths compression of 00 and FF data even if there is a fixed size metadata file by creating table and metadata structures which allow for this. FIGS. 5A, and 6B show such structures.

Presenting in a manner parallel to that for pseudo data representations, a modified translation table is shown in FIG. 5A which comprises the physical address in 4096 byte logical sectors (e.g., as used by Windows and Linux). FIG. 5A shows an embodiment of a reverse lookup table configured to provide (de)compression information. Field 501 shows a current physical address within a disk volume. Fields 442-443 show a current 512 byte sector compressed data commence point (e.g., 3 bits may be required). Fields 444-445 show a quantity of 512 byte sectors occupied by compressed sector (e.g., 3 bits may be required).

The base location referent 440 is shown. In this design, two additional fields are included. The first field 442 is a three bit value zero to seven, showing the 512 byte sector in the 4096 byte logical sector where the data is to be stored. The data configuration may change from sector to sector as the preceding data may be from one to eight physical sectors. The second field 444, is also shown as a three bit value indicating that the data consumes one to eight 512 byte blocks of data. To the extent that the only compression occurring is for continuously repeated characters, this could be a one-bit toggle because one 512 byte sector or the full 4096 byte logical sector would be the physical options. However, the full set may be required if heavier compression is used (and/or deemed desirable).

Figure 1B:
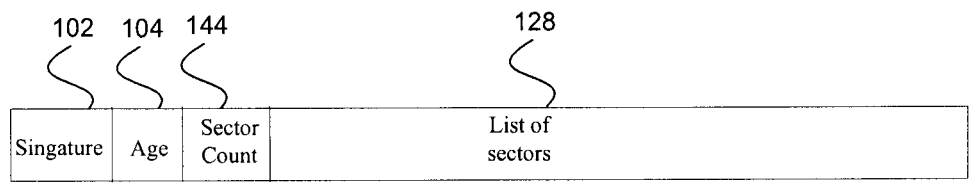
FIG. 1B shows another embodiment of a control block.

FIG. 5A shows the metadata detail of a logical sector as shown in FIGS. 1, 1A, and 1B. In the pseudo data meta block structure (FIG. 1A), the structure maintained separate counts of physically populated blocks, 124, and pseudo referents of blocks 126. In the table shown in FIG. 1B, the number of data blocks is recorded with the data present using field 144.

Finally, the metadata table as shown in FIG. 6B includes similar components as FIG. 6. Moreover, the metadata table includes active block counts 640-641, and fields 642-643 configured to reference the total number of physical blocks, whether compressed or uncompressed.

Figure 7A:
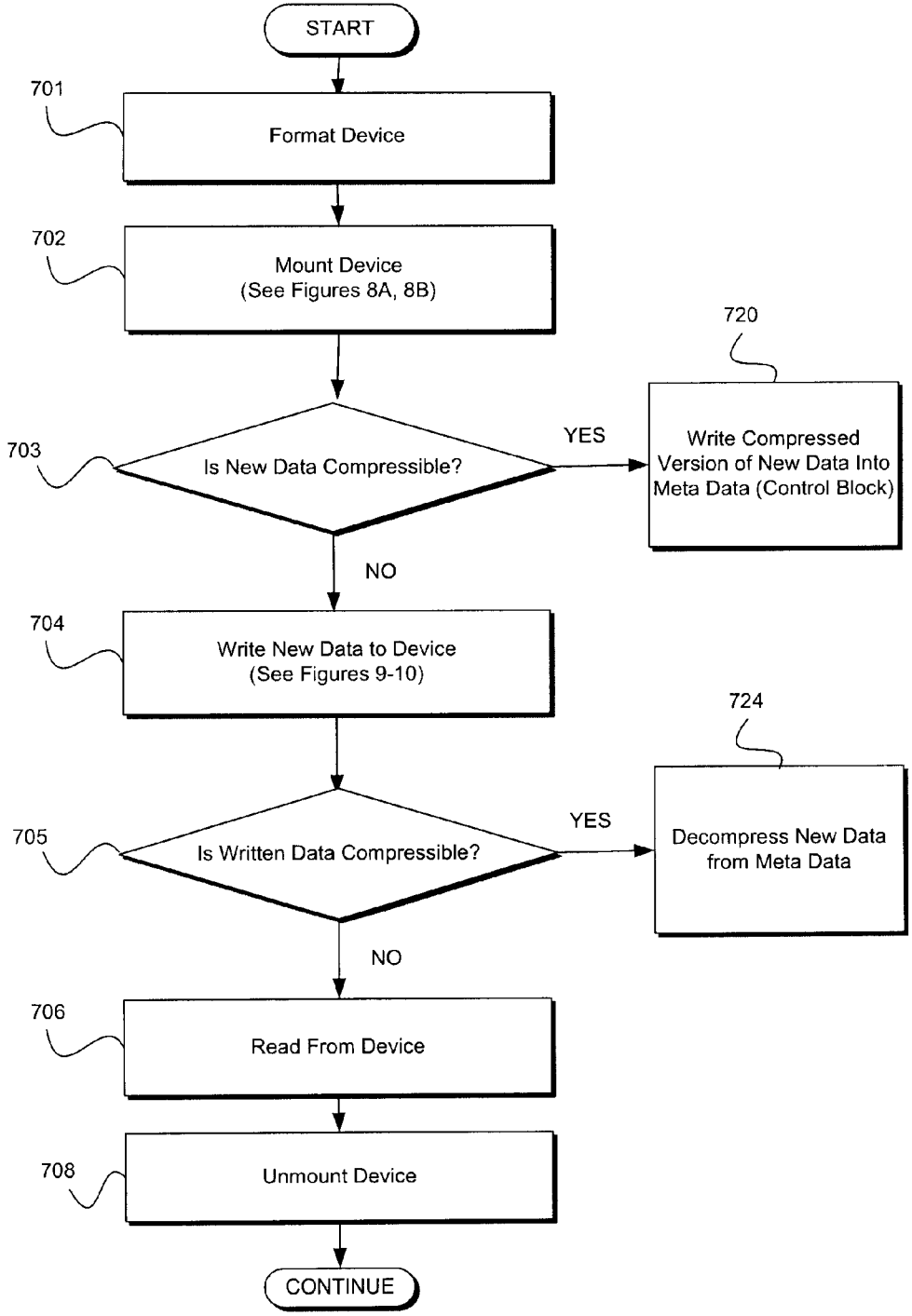
FIG. 7A shows one embodiment of a logical flow diagram for fast data storage on a block storage device using (de)compression.

With these additions, the process shown in FIG. 7A may be used to determine if a frame is compressible and if so, to execute the (de)compression, and embed it properly in the finer grid, rather than pseudonymously. These rules will apply for writing, reading, and mounting. For example, FIG. 7A includes substantially similar steps at FIG. 7, except that at decision block 703, it is determined whether the new data to be written is compressible. If the new data is compressible, data is written to the meta data control blocks and/or lookup table(s) as described above. Fields 442 and 444 may be written with data representing a compressed version of the new data. Processing then continues to decision block 705.

At decision block 705, it is determined if the written data is compressible. If so, processing continues to block 724, where the data to be read is decompressed based on the data stored in the meta data/control block (e.g., fields 442, 444) and/or the lookup table(s). Processing then continues to block 708.

While the disclosure has focused on the current embodiment, the general methodologies described herein of either using pseudonymous referents for space, or of compressing empty space are applicable to improving the real performance efficiency of any block device by increasing the total effective free space, without a physical set aside. Similarly, in the case of block devices made out of flash memory, this increases the practical erase life of the flash by reducing the number of erasures that need to be performed in order to write a specified quantity of data. The latter of these is significant. If, for instance, an average set aside can be increased from a physical level of 10 percent to an effective level of even twenty percent (as is the worst probable practical case for Linux and Windows computers), not only will average performance at least double, but the practical life will at least double as well. However, as block devices tend to be purchased on an oversized basis, and as they tend to fill up only slowly over time, even with the eventual attainment of a worst practical case, the average life improvement may be on the order of five, ten, or even twenty times that of a system with only a small physical set aside of space.

Similarly, in one embodiment, the compression and pseudonymous expression are not incompatible with each other. It is quite feasible to use the specialized advantages of pseudonymous behavior for those conditions which suit it while also using compression to squeeze even more space out of existing data structures.

Embodiments Using Limits on Write Speed

Another improvement generated by the systems and methods of the present invention is Wear Life Protection for Limited Life Media. The mechanisms described for linear writing of data significantly reduce the number of erase cycles required to write a particular datum. To the extent that one might be writing only 4096 byte sectors, have a two megabyte write and erase block, and have an effective average free space equal to thirty percent of the device, one can expect that the quantity of data capable of being written would increase by a factor of approximately 2048/4/3, or 170.

Thus, as has been indicated above, this solves the general life limitations of multi-level cell (MLC) flash devices, which only have a projected life of 5,000 to 20,000 erase cycles per erase block, in that 170*5,000 is 850,000, or well above the 100,000 minimum projected erase cycles of single-level cell (SLC) technology with its four-fold higher chip cost.

However, while this makes MLC practical for almost all computing uses, if the user of the computer were to have a run-away write condition, a 32 gb drive made of 5,000 write cycle chips and writing 46 mb/sec, would lose approximately 2.5 percent of its erase lives in a day, and die in about forty days. This is undesirable for manufacturers and users of these expensive devices.

Figure 12:
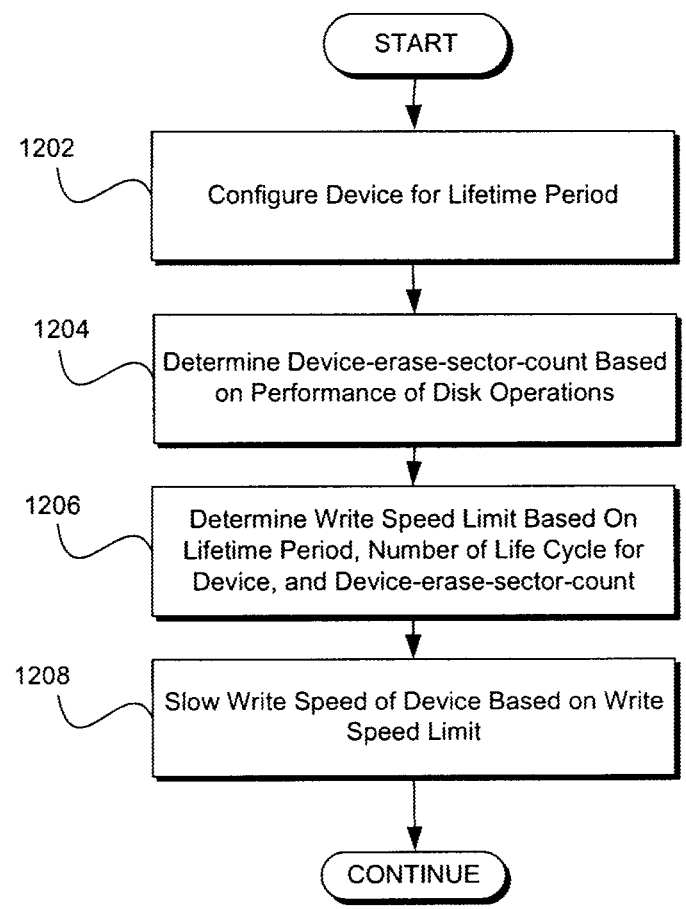
FIG. 12 shows an example of a logical flow diagram for managing a write speed of a memory device.

Accordingly, in another embodiment, a simple mechanism to avoid this problem may be used. FIG. 12 shows an example of a logical flow diagram for managing a write speed of a memory device. Generally speaking, memory devices may enable reading of the total number of erase cycles. Similarly, at least some embodiments may be configured to keep track of the number of erase operations it performs, and also to record the time from its implementation on a main computer. Given these minimal requirements, at block 1202, a memory device is configured for a lifetime period. At block 1204, a device-erase-sector-count for a plurality of disk operations is determined.

At block 1206, a write speed-limit is determined based on the lifetime period of the memory device, a projected number of life cycles for the memory device, and the determined device-erase-sector-count. In one embodiment, the limit may be computed as:

the number of life cycles/life time of device in years/365*device-erase-sector-count that occurred on a given day.

Accordingly, for a device that is configured to last for a number of years, it is possible for the embodied device to count the number of erasures it performs in a given day.

At block 1208, a write speed for the memory device is slowed based on the determined write speed-limit. In one embodiment, the write speed of the device is slowed down through insertion of timeout once a fixed value limit for any given day has been attained. In one embodiment, writing new data to an empty block may further comprise performing a time-out if a current number of writes exceeds the write speed-limit. Processing then returns to other processing.

In one example, if a device were to be configured to last for three years, and has a 5,000 cycle life, then the device may be configured such that not more than 5,000/3/365*device-erase-sector-count erasures happened on a given day. In another example, if the size of the device was 32 gigabytes, and the erase block size were 2 megabytes, the limit would be 5,000/3/365*16,000 or 73,000 erasures per day, or 146 gigabytes of data written to that 32 gigabyte device. While this seems like a tremendous amount of data, the limit represents only 3,100 seconds—about fifty-two minutes a day—of writing.

Variants of this approach can be based upon total writes (and erases) and/or an ordinal such as date of sale or manufacture, or since the last known boot of the system. Any such measures can be used to meter the quantity of writes actually happening.

The schema proposed is applicable not just to the general design proposed here, but to any device that uses linear writing, such as set forth in some other prior designs. Further, this concept is applicable to any flash device, although it may be impractical for some. For instance, MLC drives using standard random writing techniques only will write at 20-some random I/Os per second, and will fail within three years if more than 3,100 seconds of such writes are executed in an average day. Slowing these down to random write levels that might amount to only one or two a second after the first 3,100 seconds of operation in a day might produce broad customer disappointment.

Unless otherwise provided, use of the articles "a" or "an" herein to modify a noun can be understood to include one or more than one of the modified noun.

While the systems and methods described herein have been shown and described with reference to the illustrated embodiments, those of ordinary skill in the art will recognize or be able to ascertain many equivalents to the embodiments described herein by using no more than routine experimentation. Such equivalents are encompassed by the scope of the present disclosure and the appended claims.

Accordingly, the systems and methods described herein are not to be limited to the embodiments described herein, can include practices other than those described, and are to be interpreted as broadly as allowed under prevailing law.

Finally, the systems and methods described in the various embodiments should not necessarily be limited to just these particular embodiments, but are instead defined by the claims appended hereinunder, by their literal counterparts and, pursuant to equivalents determinations and the doctrine of equivalents, by all equivalent counterparts.

What is claimed is:

1. A method of fast data storage on a block storage device, comprising:
    determining if a given empty write block is empty based on state data, said given empty write block being from a list of empty write blocks, wherein the state data is associated with an entry in a lookup table for the empty write blocks;
    linearly writing new data to a data field segment within said empty write block,
    wherein said linearly writing comprises writing meta data associated with said new data to a control field within said empty write block,
    wherein said meta data within said control field is written in both a front portion at the start of said empty write segment and contiguous said new data and a back portion after said new data and contiguous thereto, and
    wherein said writing of said new data and said meta data is done linearly across the empty write block in a time-received order and not a logical order.

2. The method according to claim 1, further comprising:
    mounting the block storage device, including reading a plurality of write blocks of the block storage device and meta data therein associated with each said write block,
    wherein said reading further comprises determining if said given empty write block is empty based on state data associated with the write block.

3. The method according to claim 1, further comprising:
    updating a lookup table based in part on the meta data; and
    reading the new data based on the lookup table configured to map a logical address to a physical address;

if state data associated with the logical address indicates an empty frame:
  populating a memory at the physical address with data representing empty data.

4. The method according to claim 1, further comprising:
optimizing the block storage device, including writing to a write block having fewest active blocks; and
writing meta data associated with each said write block, wherein existing live blocks are packed to a front of the write block and rewritten to the block storage device.

5. A block storage device for optimizing data access and update patterns comprising:
  a segment of known data in logical and linear order;
  a further segment of free space for the acceptance of updates; and
  a logical area for storing update reference changes, wherein each logical address in the logical area is associated with different state data for representing whether a memory of the logical area is empty,
  wherein said segment of known data is written in linear order across a write block, said linear order being a time-received order and not a logical order,
  wherein said write block has respective portions therein, a data portion comprising data and a meta data portion comprising meta data associated with said data, said data portion and said meta data portion being contiguous within said write block, and
  wherein said meta data portion within said write block is written in both a front portion at the start of said write block, said data portion contiguous thereto and said new data therein following therefrom, and in a back portion after said data portion and contiguous said data portion.

6. The device according to claim 5, further comprising:
  a CPU configured to perform actions comprising:
    determining if a write block is empty based on state data about the write block, wherein the state data is associated with an entry in a lookup table for the write block;
    writing new data and associated meta data to said write block, said new data being stored in said data portion and said meta data being stored in said meta data portion;
    tracking a location of the new data; and
  wherein said writing of said new data and said associated meta data is done linearly across the write block.

7. The device according to claim 5, wherein the actions further comprise:
  mounting the block storage device, including reading each write block of the block storage device and meta data therein associated with each said write block,
  wherein reading further comprises determining if each said write block is empty based on state data associated with the write block.

8. The device according to claim 5, wherein the actions further comprise:
  updating a lookup table based in part on the meta data; and
  reading the new data based on the lookup table configured to map a logical address to a physical address;
  if state data associated with the logical address indicates an empty frame:
    populating a memory at the physical address with data representing empty data.

9. A method of fast data storage on a block storage device, comprising:
  receiving new data to be written to an empty write block, said new data having meta data associated therewith;
  if the new data is compressible:
    writing a portion of the new data and a count into a portion of said associated meta data,
  wherein said new data written into said empty write block is contiguous said meta data in said empty write block,
  wherein said meta data in said empty write block is written in both a front portion being at the start of said empty write block, with said new data following therefrom, and in a back portion after said new data and following therefrom, and
  wherein the written portion and the count are configured to decompress into the new data; and
  tracking a location of the new data.

10. The method according to claim 9, further comprising:
  updating a lookup table based in part on the meta data;
  reading the new data based on the lookup table configured to map a logical address to a physical address; and
  if the meta data associated with the logical address indicates a compressed frame:
    providing a decompressed version of the new data based on the meta data.

11. A block storage device for optimizing data access and update patterns comprising:
  a segment of known data in logical and linear order;
  a further segment of free space for the acceptance of updates; and
  a logical area for storing update reference changes,
  wherein each logical address in the logical area is associated with different data for representing a decompressed version of data if the data is compressible,
  wherein said segment of known data in linear order is written across a write block, said linear order being a time-received order and not a logical order,
  wherein said write block has respective portions therein, a data portion comprising said new data and a meta data portion comprising meta data associated with said new data, said data portion and said meta data portion being contiguous within said write block, and
  wherein said meta data portion within said write block is written in both a front portion at the start of said write block with said new data in said data portion following therefrom, and in a back portion after said new data and contiguous said data portion.

12. The device according to claim 11, further comprising:
  a physical address lookup table comprising at least one field comprising a physical address indexed by a logical address,
  wherein the at least one field further comprises a compression data field usable for storing a compressed version of data stored at the physical address.

13. The device according to claim 11, further comprising:
  a CPU configured to perform actions comprising:
    receiving new data and associated meta data to be written to an empty write block, said new data being stored in said data portion and said meta data being stored in said meta data portion;
    if the new data is compressible:
      writing a portion of the new data and a count into a portion of said associated meta data, wherein the written portion and the count are configured to decompress into the new data; and
      tracking a location of the new data.

14. The device according to claim 11, wherein the actions further comprise:
  updating a lookup table based in part on the meta data;

reading the new data based on the lookup table configured to map a logical address to a physical address; and if the meta data associated with the logical address indicates a compressed frame:

providing a decompressed version of the new data based on the meta data.

15. A method for data storage on a block storage device comprising:

determining a location of at least one empty write block within said block storage device; and writing data and associated meta data into respective portions within said at least one empty write block, the respective portions of said data and said associated meta data being contiguous within said at least one empty write block, wherein the portion for said associated meta data comprises a front and back portion, said front portion at the beginning of said at least one write block, and said back portion at the end of said at least one write block, and said portion for said data therebetween and contiguous thereto;

and wherein the writing of said portions of said data and said associated meta data is done linearly across said at least one empty write block, and wherein said linear writing of said data and said meta data being in a time-received order and not a logical order.

16. The method according to claim 15, wherein the size of said front and back portions are substantially equal.

17. The method according to claim 15, wherein the sizes of said front and back portions are unequal.

18. A block storage device comprising:

a segment of free space for the acceptance of new data therein; and said free space, upon said acceptance, comprising respective contiguous portions thereof therein, a first said portion comprising data and a second said portion comprising meta data associated with said data, wherein, upon said acceptance, said segment with said data portion and an associated meta data portion is written linearly across said segment, said linear writing of said data and said associated meta data being in a time-received order and not a logical order, and wherein the portion for said associated meta data comprises a front and back portion, said front portion at the beginning of said segment, said back portion at the end of said segment, and said portion for said data therebetween and contiguous thereto.

19. The block storage device according to claim 18, wherein the size of said front and back portions are substantially equal.

20. The block storage device according to claim 18, wherein the sizes of said front and back portions are unequal.

* * * * *